United States Patent
Lin et al.

(10) Patent No.: US 9,182,850 B2
(45) Date of Patent: Nov. 10, 2015

(54) TOUCH TYPE ELECTROPHORETIC DISPLAY APPARATUS

(75) Inventors: Chin-Wen Lin, Hsinchu (TW);
Kai-Cheng Chuang, Hsinchu (TW);
Ted Hong Shinn, Hsinchu (TW)

(73) Assignee: E INK HOLDINGS INC., Hsinchu (TW)

( * ) Notice: Subject to any disclaimer, the term of this patent is extended or adjusted under 35 U.S.C. 154(b) by 340 days.

(21) Appl. No.: 13/353,239

(22) Filed: Jan. 18, 2012

(65) Prior Publication Data
US 2012/0280938 A1    Nov. 8, 2012

(30) Foreign Application Priority Data
May 4, 2011    (TW) .............................. 100115549 A

(51) Int. Cl.
G06F 3/042      (2006.01)
G06F 3/038      (2013.01)
G02F 1/167      (2006.01)

(52) U.S. Cl.
CPC ............ G06F 3/0421 (2013.01); G06F 3/0383 (2013.01); G02F 1/167 (2013.01)

(58) Field of Classification Search
CPC ....... G06F 3/042; G06F 3/038; G06F 3/0421; G02F 1/167
USPC .................................................. 345/175, 207
See application file for complete search history.

(56) References Cited

U.S. PATENT DOCUMENTS

| | | | |
|---|---|---|---|
| 7,595,795 B2* | 9/2009 | Shin et al. | 345/207 |
| 2006/0077167 A1* | 4/2006 | Kim et al. | 345/98 |
| 2006/0119590 A1* | 6/2006 | Park et al. | 345/175 |
| 2010/0020006 A1* | 1/2010 | Otani | 345/102 |
| 2010/0090996 A1* | 4/2010 | Chou et al. | 345/207 |
| 2010/0156849 A1* | 6/2010 | Lee | 345/175 |
| 2011/0050642 A1* | 3/2011 | Lee et al. | 345/175 |

OTHER PUBLICATIONS

Jong-Kwon Lee, et al., "In-Cell Type Adaptive Touch for Electrophoretic Display", SID 2009 Digest, p. 870-872.*

* cited by examiner

*Primary Examiner* — Chanh Nguyen
*Assistant Examiner* — Yuzhen Shen
(74) *Attorney, Agent, or Firm* — Guice Patents PLLC

(57) ABSTRACT

A touch type electrophoretic display apparatus, including: at least one photo-controlled voltage source, used for generating at least one reference voltage, wherein the level of the at least one reference voltage gets lower/higher as the intensity of environmental light increases/decreases; and a plurality of photo sensing circuits, each of which including: a photo transistor, generating a channel current according to an incident light; a light intensity storing capacitor, used for integrating the channel current to generate a photo sensing voltage; and an output switch, used for providing an output signal.

5 Claims, 3 Drawing Sheets

TOUCH TYPE ELECTROPHORETIC DISPLAY APPARATUS

This application claims priority to Taiwan Patent Application No. 100115549, filed May 4, 2011.

BACKGROUND OF THE INVENTION

1. Field of the Invention

The present invention relates to a touch type electrophoretic display apparatus, especially to a touch type electrophoretic display apparatus using photo sensors for touch detection, wherein the output signal levels of the photo sensors can be adjusted according to the intensity of environmental light.

2. Description of the Related Art

Please refer to FIG. 1, which illustrates a sectional view of a prior art touch type electrophoretic display apparatus. As illustrated in FIG. 1, the touch type electrophoretic display apparatus includes a display substrate 100 and an electrophoretic display layer 110.

The display substrate 100 has a plurality of pixel driving circuits and a plurality of photo sensing circuits. The pixel driving circuit includes a pixel switch and a pixel capacitor, while the photo sensing circuit includes a photo transistor, a light intensity storing capacitor, and an output switch. The pixel driving circuits are used for generating an array of driving voltages to drive the electrophoretic display layer 110 to display a picture. The photo sensing circuits are used for outputting a plurality of photo sensing signals to a controller for detecting the coordinate of a touch event occurring in a touch plane.

When a finger of a user touches a local area of the touch plane, one of the photo sensing circuits will change the voltage level of the photo sensing signal, so that the controller can generate a touch coordinate accordingly. Regarding the circuit diagrams of the pixel driving circuit and the photo sensing circuit of the display substrate 100, please refer to FIG. 2. As illustrated in FIG. 2, the pixel driving circuit includes a transistor 201 and a pixel capacitor 202, while the photo sensing circuit includes a photo transistor 203, a light intensity storing capacitor 204, and an output switch 205.

The transistor 201 is used as the pixel switch, for storing a source voltage $V_S$ on the pixel capacitor 202 under the control of a gate voltage $V_G$, to determine the grey level of a pixel of the electrophoretic display layer 110.

The photo transistor 203—under the bias of a turn-off voltage $V_{OFF}$ and a supply voltage $V_P$—is used for generating a channel current according to an incident light, the stronger the incident light, the larger the channel current. When a touch event takes place at a position above one of the photo transistors 203, the incident light will become dimmer, and the channel current will reduce to a low level.

The light intensity storing capacitor 204 is used for integrating the channel current to generate a photo sensing voltage. The photo sensing voltage will exhibit a first level when the incident light on the photo transistor 203 is not shielded; the photo sensing voltage will exhibit a second level when the incident light on the photo transistor 203 becomes dimmer due to a touch operation of a user, wherein the first level is higher than the second level.

The output switch 205 is implemented by a transistor, used for outputting the photo sensing voltage through an output signal $S_{OUT}$, under the control of an output scan voltage $V_{SCAN}$. When the level of the output signal $S_{OUT}$ is lower than a threshold voltage, which is set between the first level and the second level, it indicates touched status; when the level of the output signal $S_{OUT}$ is higher than the threshold voltage, it indicates untouched status.

However, when environmental light is dim, the first level—corresponding to the situation that the incident light on the photo transistor 203 is not shielded—can be lower than the threshold voltage, and this will mistake untouched status as touched status. To solve this problem, one solution is to increase the channel width/length ratio of the photo transistors 203. Nevertheless, with the channel width/length ratio of the photo transistors 203 increased, the second level—corresponding to the situation that the incident light on the photo transistor 203 is shielded—can be higher than the threshold voltage when environmental light is strong, and this will mistake touched status as untouched status. That is, the first level and the second level can be shifted by environmental light to an extent that the touch status will not be determined correctly.

In view of the problems mentioned above, the present invention proposes a novel touch type electrophoretic display apparatus, which can adaptively adjust the level of the photo sensing voltage according to the intensity of environmental light, to prevent the touch status from being misjudged.

SUMMARY OF THE INVENTION

One objective of the present invention is to disclose a touch type electrophoretic display apparatus, which can adjust the level of a photo sensing voltage according to the intensity of environmental light, to prevent the touch status from being misjudged.

Another objective of the present invention is to disclose a touch type electrophoretic display apparatus, which can adjust the level of a photo sensing voltage without increasing the complexity of the photo sensing circuit, to prevent the touch status from being misjudged.

To attain the foregoing objectives, an embodiment of a touch type electrophoretic display apparatus is proposed, the apparatus including a plurality of pixel driving circuits, at least one photo-controlled voltage source, and a plurality of photo sensing circuits, wherein the pixel driving circuit includes a transistor and a pixel capacitor, and the photo sensing circuit includes a photo transistor, a light intensity storing capacitor, and an output switch.

The transistor is used as a pixel switch, for storing a source voltage on the pixel capacitor under the control of a gate voltage, to determine the grey level of a pixel of an electrophoretic display layer.

The at least one photo-controlled voltage source is used for generating at least one reference voltage, wherein the level of the at least one reference voltage gets lower/higher as the intensity of environmental light increases/decreases.

The photo transistor has a first gate terminal, a first channel terminal, and a second channel terminal The first gate terminal is coupled to a turn-off voltage, the first channel terminal is coupled to a supply voltage, and the second channel terminal is coupled to the light intensity storing capacitor. The photo transistor generates a channel current according to an incident light—the stronger the incident light, the larger the channel current.

The light intensity storing capacitor has a first electrode and a second electrode. The first electrode is coupled to the second channel terminal of the photo transistor, and the second electrode is coupled to one of the reference voltages. The light intensity storing capacitor is used for integrating the channel current to generate a photo sensing voltage at the first electrode. The photo sensing voltage will exhibit a first level when the incident light on the photo transistor is not shielded, and exhibit a second level when the incident light on the photo transistor becomes dimmer due to a touch operation of a user, wherein the first level is higher than the second level.

The output switch has a second gate terminal, a third channel terminal, and a fourth channel terminal The second gate terminal is coupled to an output scan voltage, the third channel terminal is coupled to the first electrode of the light intensity storing capacitor, and the fourth channel terminal is used for providing an output signal. When the level of the output signal is lower than a threshold voltage, which is set between the first level and the second level, it indicates touched status; when the level of the output signal is higher than the threshold voltage, it indicates untouched status.

The present invention possesses the following advantages due to its novel design:

1. The at least one photo-controlled voltage source of the present invention can adaptively adjust the level of at least one reference voltage source according to environmental light, so as to make the level of the photo sensing voltage higher than a threshold voltage when the photo sensing voltage corresponds to untouched status, and the level of the photo sensing voltage lower than the threshold voltage when the photo sensing voltage is caused by a touched operation, and thereby ensure correct detection of touch events.

2. The touch type electrophoretic display apparatus of the present invention can ensure correct detection of touch events without increasing the complexity of the photo sensing circuit, or demanding careful adjustment of the channel width/length ratio of the photo transistors.

To make it easier for our examiner to understand the objective of the invention, its structure, innovative features, and performance, we use a preferred embodiment, together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
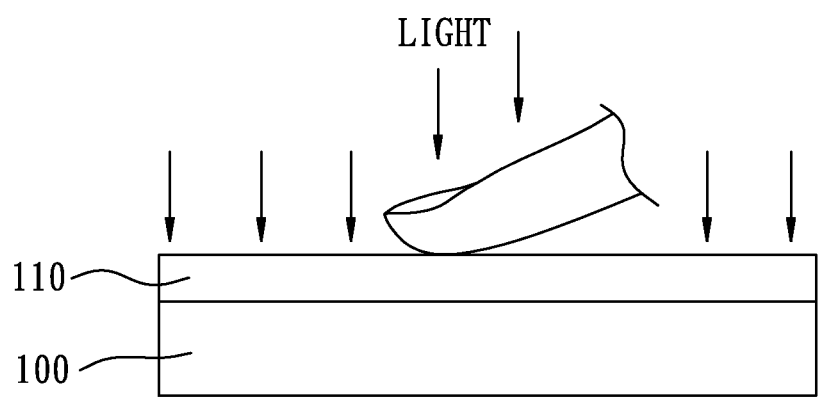
FIG. 1 illustrates a sectional view of a prior art touch type electrophoretic display apparatus.
Figure 2:
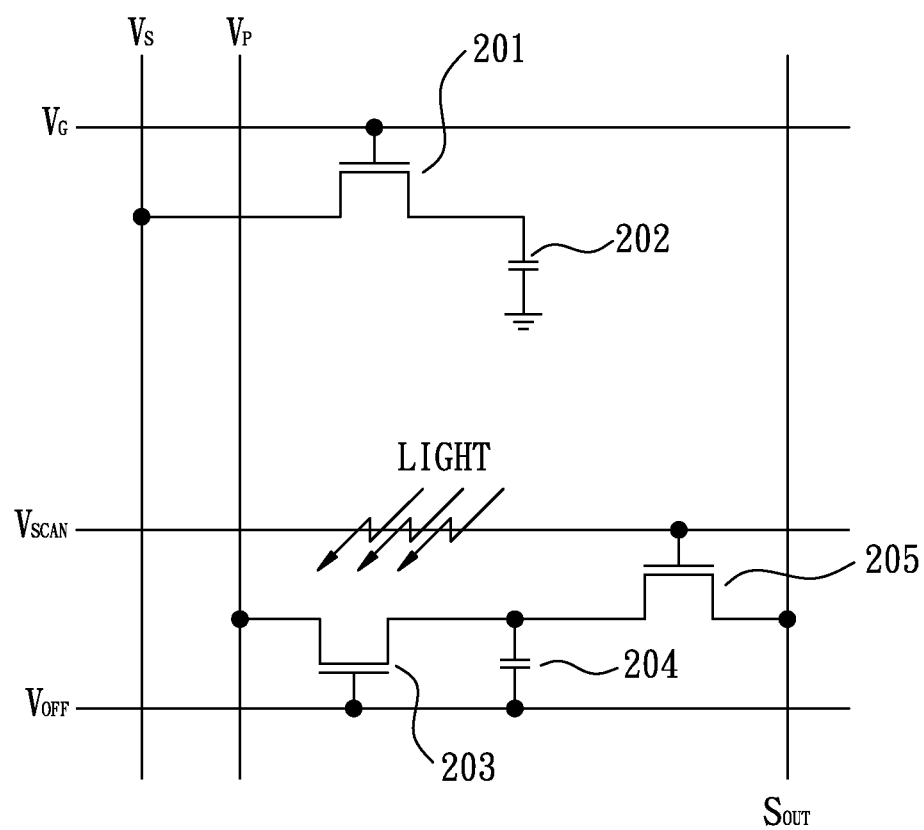
FIG. 2 illustrates the circuit diagrams of the pixel driving circuit and the photo sensing circuit of the display substrate of the electrophoretic display apparatus of FIG. 1.
Figure 3:
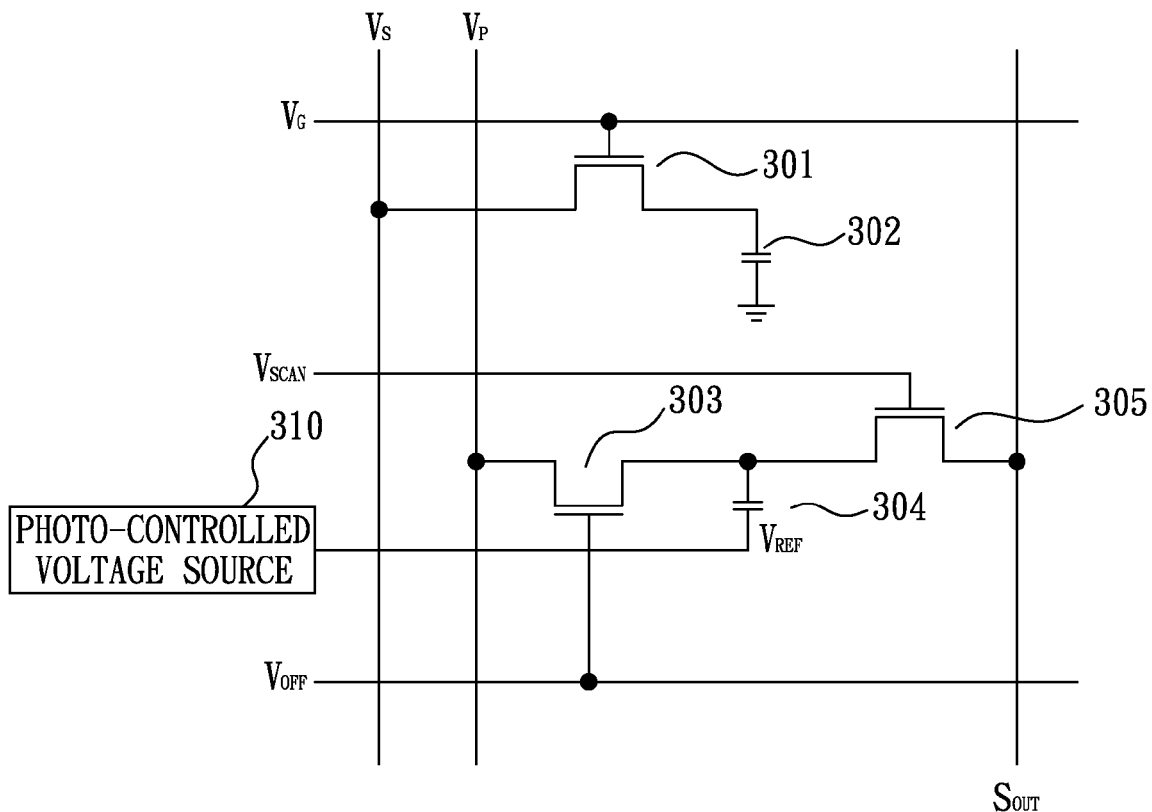
FIG. 3 illustrates the circuit diagrams of the pixel driving circuit and the photo sensing circuit of a touch type electrophoretic display apparatus according to a preferred embodiment of the present invention.

Please refer to FIG. 3, which illustrates the circuit diagram of a touch type electrophoretic display apparatus according to a preferred embodiment of the present invention. As illustrated in FIG. 3, the circuit includes: a pixel driving circuit consisting of a transistor 301 and a pixel capacitor 302; a photo-controlled voltage source 310; and a photo sensing circuit consisting of a photo transistor 303, a light intensity storing capacitor 304, and an output switch 305.

The transistor 301 is used as a pixel switch, for storing a source voltage $V_S$ on the pixel capacitor 302 under the control of a gate voltage $V_G$, to determine the grey level of a pixel of an electrophoretic display layer.

The photo transistor 303 has a first gate terminal, a first channel terminal, and a second channel terminal The first gate terminal is coupled to a turn-off voltage $V_{OFF}$, the first channel terminal is coupled to a supply voltage $V_P$, and the second channel terminal is coupled to the light intensity storing capacitor 304. The photo transistor 303 is used for generating a channel current according to an incident light, the stronger the incident light, the larger the channel current. When a touch event takes place at a position above one of the photo transistors 303, the incident light will become dim, and the channel current will reduce to a low level.

The light intensity storing capacitor 304 has a first electrode and a second electrode, with the first electrode coupled to the second channel terminal of the photo transistor 303, and the second electrode coupled to a reference voltage $V_{REF}$. The light intensity storing capacitor 304 is used for integrating the channel current to generate a photo sensing voltage at the first electrode. The photo sensing voltage will exhibit a first level when the incident light on the photo transistor 303 is not shielded, and exhibit a second level when the incident light on the photo transistor 303 becomes dim due to a touch operation of a user, wherein the first level is higher than the second level.

The output switch 305 is implemented by a transistor, having a second gate terminal, a third channel terminal, and a fourth channel terminal The second gate terminal is coupled to an output-scan voltage $V_{SCAN}$, the third channel terminal is coupled to the first electrode of the light intensity storing capacitor 304, and the fourth channel terminal is used for providing an output signal $S_{OUT}$. The output switch 305 is used for outputting the photo sensing voltage through the output signal $S_{OUT}$, under the control of the output scan voltage $V_{SCAN}$. When the level of the output signal $S_{OUT}$ is lower than a threshold voltage, which is set between the first level and the second level, it indicates touched status; when the level of the output signal $S_{OUT}$ is higher than the threshold voltage, it indicates untouched status.

Figure 4:
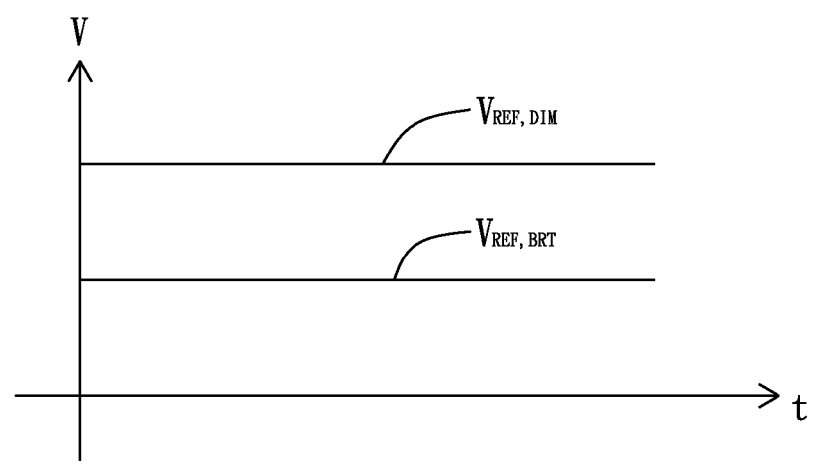
FIG. 4 illustrates two levels of the reference voltage $V_{REF}$ corresponding to two different environmental lights.

The photo-controlled voltage source 310 is used to generate the reference voltage $V_{REF}$ according to the intensity of environmental light, wherein the level of the reference voltage $V_{REF}$ gets lower/higher as the intensity of environmental light increases/decreases. Please refer to FIG. 4, which illustrates two levels of the reference voltage $V_{REF}$ corresponding to two different environmental lights. As illustrated in FIG. 4, $V_{REF,DIM}$ represents the level of the reference voltage $V_{REF}$ under a weak environmental light, while $V_{REF,BRT}$ represents the level of the reference voltage $V_{REF}$ under a strong environmental light.

When the intensity of environmental light decreases, the reference voltage $V_{REF}$ will shift upward to compensate the lowered down effect of the output signal $S_{OUT}$ caused by the decreasing of the channel current of the photo transistor 303, so as to prevent touch events from being misjudged. When the intensity of environmental light increases, the reference voltage $V_{REF}$ will shift downward to compensate the lifted up effect of the output signal $S_{OUT}$ caused by the increasing of the channel current of the photo transistor 303, so as to prevent touch events from being misjudged. That is, by using the photo-controlled voltage source 310, which generates a lower/higher reference voltage $V_{REF}$ according to strong/weak environmental light, and coupling the reference voltage $V_{REF}$ to the second electrode of the light intensity storing capacitor 304, the present invention can compensate the level shift effect of the output signal $S_{OUT}$ caused by variation of environmental light, and thereby ensure correct detection of touch events. The number of the photo-controlled voltage source 310 can be adjusted according to the size of a touch plane: the number can be singular—one—when a small touch plane is concerned; or plural—so as to cover each corner of a touch plane—when the touch plane is large.

In conclusion, the photo-controlled voltage source of the touch type electrophoretic display apparatus of the present invention can adjust the level of a reference voltage source according to the intensity of environmental light, so as to ensure correct detection of touch events. Besides, the combination of the photo-controlled voltage source with the photo sensing circuit of the present invention does not require complex circuit connection, and does not demand careful adjustment of the channel width/length ratio of the photo transistor either. The present invention therefore does improve prior art touch type electrophoretic display apparatuses.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A touch type electrophoretic display apparatus, comprising:
   at least one photo-controlled voltage source generating at least one reference voltage according to the intensity of environmental light, wherein the level of said reference voltage gets lower/higher as the intensity of environmental light increases/decreases; and
   a plurality of photo sensing circuits, each of said photo sensing circuits comprising:
   a photo transistor, having a first gate terminal, a first channel terminal, and a second channel terminal, said first gate terminal coupled to a turn-off voltage, said first channel terminal coupled to a supply voltage, and said photo transistor generating a channel current according to an incident light, wherein said channel current gets larger/smaller as the intensity of said incident light increases/decreases;
   a light intensity storing capacitor, having a first electrode and a second electrode, said first electrode of said light intensity storing capacitor is coupled to said second channel terminal of said photo transistor and said second electrode of said light intensity storing capacitor is coupled to said at least one photo-controlled voltage source and receiving said at least one reference voltage, and said light intensity storing capacitor used for integrating said channel current to generate a photo sensing voltage at said first electrode; and
   an output switch, having a second gate terminal, a third channel terminal, and a fourth channel terminal, said output switch is coupled to two electrical components consisting of said light intensity storing capacitor and said photo transistor, said second gate terminal coupled to an output scan voltage, said third channel terminal of said output switch has couplings consisting of two couplings being said third channel terminal of said output switch is coupled to said first electrode of said light intensity storing capacitor and said second channel terminal of said photo transistor, and said fourth channel terminal used for providing an output signal;
   wherein, when the intensity of the environmental light decreases, the reference voltage provided by the at least one photo-controlled voltage source to the photo transistor of a corresponding photo sensing circuit of the plurality of photo sensing circuits is increased to be an increased reference voltage, and when the intensity of the environmental light increases, the reference voltage provided by the at least one photo-controlled voltage source to the photo transistor of the corresponding photo sensing circuit of the plurality of photo sensing circuits is decreased to be an decreased reference voltage;
   wherein the photo-controlled voltage source provides the increased reference voltage and the decreased reference voltage to the photo transistor of the corresponding photo sensing circuit of the plurality of photo sensing circuits as the intensity of environmental light decreases and increases, respectively;
   wherein said at least one photo-controlled voltage source including an output terminal connected to said third channel terminal of said output switch through said second electrode of said light intensity storing capacitor and having no terminal directly connected to said third terminal of said output switch.

2. The touch type electrophoretic display apparatus as claim 1, further comprising a plurality of pixel driving circuits, each of said pixel driving circuits comprising a transistor, used as a pixel switch for storing a source voltage on a pixel capacitor under the control of a gate voltage, to determine the grey level of a pixel of an electrophoretic display layer.

3. A touch type electrophoretic display apparatus, comprising:
   a photo-controlled voltage source generating a reference voltage according to the intensity of environmental light, wherein the level of said reference voltage gets lower/higher as the intensity of environmental light increases/decreases; and
   a plurality of photo sensing circuits, each of said photo sensing circuits comprising:
   a photo transistor, having a first gate terminal, a first channel terminal, and a second channel terminal, said first gate terminal coupled to a turn-off voltage, said first channel terminal coupled to a supply voltage, and said photo transistor generating a channel current according to an incident light, wherein said channel current gets larger/smaller as the intensity of said incident light increases/decreases;
   a light intensity storing capacitor, having a first electrode and a second electrode, said first electrode of said light intensity storing capacitor is coupled to said second channel terminal of said photo transistor and said second electrode of said light intensity storing capacitor is coupled to said at least one photo-controlled voltage source and receiving said at least one reference voltage, and said light intensity storing capacitor used for integrating said channel current to generate a photo sensing voltage at said first electrode; and
   an output switch, having a second gate terminal, a third channel terminal, and a fourth channel terminal, said output switch is coupled to two electrical components consisting of said light intensity storing capacitor and said photo transistor, said second gate terminal coupled to an output scan voltage, said third channel terminal of said output switch has couplings consisting of two couplings being said third channel terminal of said output switch is coupled to said first electrode of said light intensity storing capacitor and said second channel terminal of said photo transistor, and said fourth channel terminal used for providing an output signal;

wherein, when the intensity of the environmental light decreases, the reference voltage provided by the at least one photo-controlled voltage source to the photo transistor of a corresponding photo sensing circuit of the plurality of photo sensing circuits is increased to be an increased reference voltage, and when the intensity of the environmental light increases, the reference voltage provided by the at least one photo-controlled voltage source to the photo transistor of the corresponding photo sensing circuit of the plurality of photo sensing circuits is decreased to be an decreased reference voltage;

wherein the photo-controlled voltage source provides the increased reference voltage and the decreased reference voltage to the photo transistor of the corresponding photo sensing circuit of the plurality of photo sensing circuits as the intensity of environmental light decreases and increases, respectively;

wherein said at least one photo-controlled voltage source including an output terminal connected to said third channel terminal of said output switch through said second electrode of said light intensity storing capacitor and having no terminal directly connected to said third terminal of said output switch.

4. The touch type electrophoretic display apparatus as claim 3, further comprising a plurality of pixel driving circuits, each of said pixel driving circuits comprising a transistor, used as a pixel switch for storing a source voltage on a pixel capacitor under the control of a gate voltage, to determine the grey level of a pixel of an electrophoretic display layer.

5. A touch type electrophoretic display apparatus, comprising:
 a plurality of pixel driving circuits, each of said pixel driving circuits comprising a transistor, used as a pixel switch for storing a source voltage on a pixel capacitor under the control of a gate voltage, to determine the grey level of a pixel of an electrophoretic display layer;
 at least one photo-controlled voltage source generating at least one reference voltage according to the intensity of environmental light, wherein the level of said reference voltage gets lower/higher as the intensity of environmental light increases/decreases; and
 a plurality of photo sensing circuits, each of said photo sensing circuits comprising:
 a photo transistor, having a first gate terminal, a first channel terminal, and a second channel terminal, said first gate terminal coupled to a turn-off voltage, said first channel terminal coupled to a supply voltage, and said photo transistor generating a channel current according to an incident light, wherein said channel current gets larger/smaller as the intensity of said incident light increases/decreases;
 a light intensity storing capacitor, having a first electrode and a second electrode, said first electrode of said light intensity storing capacitor is coupled to said second channel terminal of said photo transistor and said second electrode of said light intensity storing capacitor is coupled to said at least one photo-controlled voltage source and receiving said at least one reference voltage, and said light intensity storing capacitor used for integrating said channel current to generate a photo sensing voltage at said first electrode; and
 an output switch, having a second gate terminal, a third channel terminal, and a fourth channel terminal, said output switch is coupled to two electrical components consisting of said light intensity storing capacitor and said photo transistor, said second gate terminal coupled to an output scan voltage, said third channel terminal of said output switch has couplings consisting of two couplings being said third channel terminal of said output switch is coupled to said first electrode of said light intensity storing capacitor and said second channel terminal of said photo transistor, and said fourth channel terminal used for providing an output signal;

wherein, when the intensity of the environmental light decreases, the reference voltage provided by the at least one photo-controlled voltage source to the photo transistor of a corresponding photo sensing circuit of the plurality of photo sensing circuits is increased to be an increased reference voltage, and when the intensity of the environmental light increases, the reference voltage provided by the at least one photo-controlled voltage source to the photo transistor of the corresponding photo sensing circuit of the plurality of photo sensing circuits is decreased to be an decreased reference voltage;

wherein the photo-controlled voltage source provides the increased reference voltage and the decreased reference voltage to the photo transistor of the corresponding photo sensing circuit of the plurality of photo sensing circuits as the intensity of environmental light decreases and increases, respectively;

wherein said at least one photo-controlled voltage source including an output terminal connected to said third channel terminal of said output switch through said second electrode of said light intensity storing capacitor and having no terminal directly connected to said third terminal of said output switch.

* * * * *